US012211334B2

(12) United States Patent
Reinhard

(10) Patent No.: US 12,211,334 B2
(45) **Date of Patent: *Jan. 28, 2025**

(54) APPARATUS AND METHOD FOR DETECTING A MACHINE-READABLE SECURITY FEATURE OF A VALUE DOCUMENT

(71) Applicant: CI Tech Sensors AG, Burgdorf (CH)

(72) Inventor: Christoph Reinhard, Burgdorf (CH)

(73) Assignee: CI Tech Sensors AG, Burgdorf (CH)

(*) Notice: Subject to any disclaimer, the term of this patent is extended or adjusted under 35 U.S.C. 154(b) by 0 days.

This patent is subject to a terminal disclaimer.

(21) Appl. No.: 17/667,992

(22) Filed: Feb. 9, 2022

(65) Prior Publication Data

US 2022/0172546 A1 Jun. 2, 2022

Related U.S. Application Data

(63) Continuation of application No. 16/224,255, filed on Dec. 18, 2018, now Pat. No. 11,263,855.

(30) Foreign Application Priority Data

Dec. 22, 2017 (EP) .................................... 17210198

(51) Int. Cl.
*B42D 25/378* (2014.01)
*G07D 7/005* (2016.01)
(Continued)

(52) U.S. Cl.
CPC ........... *G07D 7/005* (2017.05); *B42D 25/378* (2014.10); *G07D 7/12* (2013.01); *G07D 7/121* (2013.01);
(Continued)

(58) Field of Classification Search
CPC ........ B42D 25/23; B42D 25/24; B42D 25/29; B42D 25/378; G07D 2207/00; G07D 7/005; G07D 7/12; G07D 7/121
See application file for complete search history.

(56) References Cited

U.S. PATENT DOCUMENTS

| | | | | |
|---|---|---|---|---|
| 11,263,855 B2 * | 3/2022 | Reinhard | B42D 25/378 | |
| 2005/0121619 A1 * | 6/2005 | Aleu | G07D 7/12 | 250/458.1 |

(Continued)

FOREIGN PATENT DOCUMENTS

| | | | |
|---|---|---|---|
| EP | 2706511 | A1 | 3/2014 |
| WO | 0241264 | A1 | 5/2002 |
| WO | 2006079810 | A1 | 8/2006 |

OTHER PUBLICATIONS

Second Office Action filed in the corresponding Chinese Application (written in the Chinese language); 9 pages.

(Continued)

*Primary Examiner* — Violeta A Prieto
(74) *Attorney, Agent, or Firm* — Black McCuskey

(57) ABSTRACT

A device for verifying a machine-readable security feature of a document of value, having: a transport device configured to transport the document on a transport plane, a radiation emitter that is arranged on a first flat side and emits radiation in the direction towards the first flat side, a sensor that is arranged on the first flat side and is configured to receive at least part of the luminescent radiation, a reflector arranged and configured on the second flat side-so as to at least partly reflect the luminescent radiation of the security feature of the document of value to the sensor, and an evaluation unit.

10 Claims, 4 Drawing Sheets

(51) Int. Cl.

| | |
|---|---|
| ***G07D 7/12*** | (2016.01) |
| ***G07D 7/121*** | (2016.01) |
| *B42D 25/23* | (2014.01) |
| *B42D 25/24* | (2014.01) |
| *B42D 25/29* | (2014.01) |

(52) U.S. Cl.

CPC .............. *B42D 25/23* (2014.10); *B42D 25/24* (2014.10); *B42D 25/29* (2014.10); *G07D 2207/00* (2013.01)

(56) References Cited

U.S. PATENT DOCUMENTS

| | | | | |
|---|---|---|---|---|
| 2005/0213078 | A1* | 9/2005 | Grob | G07D 7/1205 356/71 |
| 2005/0251120 | A1* | 11/2005 | Anderson | A61B 8/485 606/20 |
| 2010/0295291 | A1* | 11/2010 | Rancien | B42D 25/29 428/29 |
| 2010/0330304 | A1* | 12/2010 | Geuens | B32B 27/16 428/29 |
| 2012/0104102 | A1* | 5/2012 | Rancien | G06K 19/025 235/488 |
| 2014/0063567 | A1* | 3/2014 | Ikari | G07D 7/2008 358/474 |
| 2018/0068512 | A1* | 3/2018 | Jiao | G07D 11/16 |
| 2018/0346271 | A1* | 12/2018 | Nakamura | B65H 7/08 |
| 2019/0236883 | A1* | 8/2019 | Reinhard | G07D 7/121 |

OTHER PUBLICATIONS

Extended European Search Report filed in corresponding European Application; 7 pages.

* cited by examiner

APPARATUS AND METHOD FOR DETECTING A MACHINE-READABLE SECURITY FEATURE OF A VALUE DOCUMENT

CROSS-REFERENCE TO RELATED APPLICATION

This application is a continuation of U.S. patent application Ser. No. 16/224,255, filed Dec. 18, 2019, which claims priority to and claims the benefit of European Patent Application Serial No. 17 210 198.2, which was filed on Dec. 22, 2017.

TECHNICAL FIELD

The invention relates to a device for verifying a machine-readable security feature of a document of value, and to a method for verifying a machine-readable security feature of a document of value.

BACKGROUND

Documents of value such as coupons or for example banknotes, cheques, shares, papers with a security print, certificates, identity passes, passports, tickets, travel tickets, vouchers, identity or access cards or the like may be provided with security features on the front side thereof, the rear side thereof and/or embedded in the material in order to make counterfeiting thereof more difficult or to prevent it, and in order to be able to check their authenticity. In the exemplary case of a banknote, one type of security feature may be a region printed with luminescent (for example phosphorescent and/or fluorescent) ink. As the luminescence, the reflection behaviour and/or the transmission behaviour of such a region of the banknote are only able to be imitated with a large amount of effort, this constitutes an effective security feature that is also able to be checked by a machine.

An automatic authenticity check on a banknote is performed for example by a device provided in an automated teller machine for the purpose of verifying security features, for example when a banknote is removed from the automated teller machine or is inserted into same. In this case, the banknote is normally transported through the device, the printed region is irradiated by way of a radiation source, the specific reflection behaviour, transmission behaviour and/or luminescence behaviour is sensed by a sensor and evaluated by way of an evaluation unit; if the security feature is not sensed or is sensed erroneously, the banknote is identified as a (potential) counterfeit and is removed from circulation.

The banknote may arbitrarily adopt two alignments during transport through the device, that is to say either with the front side or with the rear side pointing perpendicular to the transport direction, such that the luminescent region may be situated on either of the two sides with respect to the transport direction. As a result, both sides of the banknote need to be checked in the device. To achieve this, the luminescent region is normally sensed through reflection, that is to say the banknote is irradiated from one side and the reflection and/or luminescence is sensed on the same side, or through transmission, that is to say the banknote is irradiated from one side and the radiation and/or luminescence that passes through is sensed on the other side. In both cases, active components of the device (for example radiation sources and/or sensors) are situated on both sides of the banknote.

Therefore, in the case of a conventional device, problems arise to the extent that said device requires a large amount of space, the active components and their wiring are required on two sides and the components have to be synchronized depending on the transport speed in order to be able to securely sense the security feature on both sides.

In response to this, a device for verifying a machine-readable security feature of a document of value by way of a sensor system arranged on one side and a method are provided, which device and method enable secure automatic sensing of a security feature of a document of value in a device.

SUMMARY

A device according to one exemplary embodiment may have a transport device, a radiation emitter, a sensor, a reflector and an evaluation unit. The device may be used to handle documents of value, that is to say receive them, transport them through the device by way of the transport advice, check them and dispense them. The document of value (for example a banknote) may be a flat, for example rectangular, object made for example from paper or other fibrous material, plastic or a combination thereof and may have a first flat side and a second flat side opposite said first flat side. In the case of a rectangular document of value, this may have a long edge and an edge that is short in relation thereto. The device may be provided for example in an automated teller machine. In addition, the device may likewise be provided in numerous types of machine that handle documents of value, for example in paying-in machines, travel ticket machines, food machines and beverage machines. The construction and the function of such machines are sufficiently known, and so a description of them is not given.

The transport device may be configured to transport (for example by way of roller means and/or conveyor-belt means) the document of value through the device on a (for example flat or curved) transport plane in a transport direction. The transport plane may (for example at least substantially) be aligned perpendicular to a direction of gravity or (for example at least substantially) parallel to the direction of gravity. During the transporting of the document of value through the transport device, the flat sides of the document of value may extend (for example at least substantially) parallel to the transport plane.

The radiation emitter may for example be arranged fixedly for example corresponding to a flat side (for example to the first or to the second flat side) and emit radiation in the direction towards the flat side, for example when the document of value is transported past it. The emitted radiation may be configured to excite luminescent radiation of a security feature of the document of value, for example of a region of the document of value that is suitable for phosphorescence and/or fluorescence. Such a region may be situated on one or each of the flat sides and/or embedded in the material of the document of value. The radiation may furthermore be configured to pass at least partly through the document of value. By way of example, the emitted radiation is able to be tuned to the type of the document of value and of the security feature, for example by using different radiation emitters.

The sensor may for example be arranged fixedly for example corresponding to a flat side (for example to the first or to the second flat side, for example on the same flat side as the radiation emitter). The sensor may be arranged for example in front of, behind, to the left or to the right of the radiation emitter with respect to the transport direction of the document of value. Furthermore, the sensor may be configured to receive at least part of the luminescent radiation and/or of the emitted radiation and to output a corresponding signal. By way of example, the emitted radiation may be (for example at least substantially) radiation that is reflected at the document of value and/or that has passed through the document of value. The different reflection behaviour and transmission behaviour and the luminescence behaviour of the security feature in comparison with the rest of the banknote may be able to be sensed by the sensor.

By way of example, the sensor and the radiation emitter may be arranged so as to be movable for example together (for example synchronously), for example parallel to the transport plane, for example (at least substantially) transverse to the transport direction. Furthermore, the sensor and the radiation emitter may be embodied for example as an integral unit.

The reflector may for example be arranged corresponding to a flat side (for example to the first or to the second flat side, for example at the flat side facing away from the radiation emitter), (for example at least substantially) parallel to the flat side. The reflector may extend (for example at least substantially) transverse to the transport direction, for example with a width that corresponds (for example at least substantially) to the document of value, that is to say the reflector may correspond at least to the length of an edge of the document of value. The reflector may furthermore be configured to reflect the emitted radiation, passing through the document of value, of the radiation emitter and/or the luminescent radiation of the security feature of the document of value at least partly to the sensor. The reflector may furthermore be arranged such that a beam path of the type radiation emitter—reflector—sensor is formed. The reflector may for example also be curved such that the radiation reflected thereby is focused on the sensor. For example, the reflector may reflect radiation in a wavelength-selective manner, for example tuned to the wavelength of the emitted radiation and/or the luminescent radiation.

The evaluation unit may be configured to control the radiation emitter and to receive the signals output by the sensor. The control may comprise for example: switching on/switching off the radiation emitter depending on the transport speed. Furthermore, the evaluation unit may be implemented as hardware, for example as an integrated circuit (for example in the manner of an FPGA, ASIC, microcontroller, etc.), and the evaluation unit may for example process the signals of the sensor and determine the presence of a security feature, for example by executing software by means of which method steps for verifying a security feature of a document of value are implemented.

The radiation emitter may for example be configured to emit the radiation as infrared radiation, for example in the region of approximately 750 nm-3000 nm. By way of example, the emitted radiation may have a near-infrared spectrum, preferably approximately 780 nm-1400 nm, and further preferably approximately 850 nm-1000 nm. By way of example, radiation may also be emitted in the visible spectrum (for example approximately 380 nm-750 nm) or in the ultraviolet spectrum (for example approximately 200 nm-380 nm).

The radiation emitter may be for example a light-emitting diode (LED for short hereinafter) (for example an organic LED); other radiation emitters are also possible, however, which may emit an IR spectrum. By way of example, a plurality of (for example separate) LEDs may be used as radiation emitter, which LEDs emit for example in different spectra so as to be suitable for sensing different types of security feature.

The sensor may be for example a photodiode, which is tuned for example to the spectrum of the radiation emitter. By way of example, the sensitivity maximum of the photodiode lies in a wavelength region that corresponds to a maximum of the emitted radiation and/or of the luminescent radiation. The tuning may be performed for example by an optical filter that filters out undesired wavelengths (for example ambient light). By way of example, the sensor may be surrounded (for example encapsulated, for example cast) by a corresponding material (for example plastic) for this purpose.

The sensor and the radiation emitter may be at least partly surrounded (for example encapsulated, for example cast) for example by a material (for example plastic) transparent to the luminescent radiation and the emitted radiation, for example in order to fix these components in the device and in order to protect against soiling/damage.

The reflector may for example be arranged at a distance (for example at least substantially perpendicular) from the flat side of the document of value, which distance is for example approximately a maximum of 10 mm, preferably approximately 5 mm and more preferably approximately 1.5 mm, wherein a small distance increases the proportion of reflected radiation.

The radiation emitter may have for example a first component radiation emitter (for example a first LED) and a second component radiation emitter (for example a second LED) and the sensor may be arranged between the first component radiation emitter and the second component radiation emitter. By way of example, this arrangement may extend (for example at least substantially) transverse to the transport direction.

An optical axis of the sensor may for example be (at least substantially) perpendicular to the transport plane, wherein a distance of the sensor from the flat side of the document of value is for example approximately 1 mm-3 mm, preferably approximately 1 mm-2 mm and more preferably approximately 1 mm, wherein a small distance increases the radiation intensity of the document of value.

A field of vision (for example along, for example symmetrical to, the optical axis) of the sensor may be configured for example such that a minimum dimension, able to be sensed by the sensor, of the security feature of the document of value, for example transverse to the transport direction, which is able to be sensed with respect to a maximum signal strength of the sensor when sensing the security feature with a signal strength of at least 50%, is approximately 5 mm-10 mm and preferably approximately 6.5 mm-7.5 mm. By way of example, for this purpose, the distance of the sensor from the document of value, the sensitivity of the sensor, the field of vision of the sensor, the transport speed, the intensity of the emitted radiation, etc. may be varied.

An optical axis of the radiation emitter may be inclined with respect to the transport plane for example such that its point of intersection with the transport plane and the reflector lies in the field of vision of the sensor (for example intersects the optical axis of the sensor).

In the device, the sensor may for example interact with the radiation emitter as a sensing channel. By way of example, the sensor and the radiation emitter of a sensing channel are calibrated together, for example in order to compensate for deviations in component characteristics (for example tolerances). Such a sensing channel may for example sense a strip of the document of value (which corresponds for example to the field of vision of the sensor) in the transport direction when the document of value is transported. By way of example, depending on the type (for example size) of the document of value, a plurality of sensing channels may be arranged next to one another transverse to the transport direction of the document of value. There may be provision for example for five, six, seven, eight, nine, ten, eleven or more sensing channels. The distance between the optical axes of the sensors of such sensing channels may be for example approximately 30 mm, preferably approximately 20 mm and more preferably approximately 17.5 mm, in order also to be able to sense small security features.

The document of value may be for example one of the following: a banknote, a cheque, proof of identity, a passport, a travel ticket and a share document.

The transport device may for example be configured such that the document of value (for example the banknote) is able to be transported through the device with one of its long edges at the front.

The method for verifying a machine-readable security feature of a document of value according to one exemplary embodiment, wherein the document of value is transported between a sensor and a radiation emitter on one side and a reflector on the other side, may involve: transporting the document of value at a predetermined transport speed (for example approximately 1.8 m/s-3.4 m/s), irradiating (for example with infrared radiation) the document of value, by way of the radiation emitter, for a predetermined duration (for example approximately 75 μs), for example during and/or after the irradiation, sensing, using the sensor, a plurality of measured values over a predetermined duration (for example approximately 400 μs) that corresponds to luminescent radiation (for example fluorescence and/or phosphorescence) of the security feature that is excited by the radiation, and/or to radiation reflected by the document of value and/or by the reflector, forming a signal profile from the measured values using an evaluation unit, and evaluating, using the evaluation unit, whether a security feature is present by comparing the sensed signal profiles (for example partial regions thereof). By way of example, the sensed signal profiles may be compared with one another or with a predetermined reference signal profile. Furthermore, since a position of the security feature is unknown, the method may be performed for example for as long (repeatedly) as the document of value is transported past the sensor.

The evaluation of the signal profiles may for example reveal that a security feature is present if a value formed in a subtraction of the signal profiles is greater than a reference value.

BRIEF DESCRIPTION OF THE DRAWINGS

Exemplary embodiments of the device and of the method are illustrated in the figures and explained in more detail below.

DESCRIPTION

In the following detailed description, reference is made to the attached drawings, which form part of said description and in which specific embodiments in which the invention is able to be implemented are shown for the sake of clarification. In this respect, directional terminology such as "top", "bottom", "left", "right" etc. is used with reference to the orientation of the described figure(s). As components of embodiments are able to be positioned in a number of different orientations, the directional terminology serves for clarification and is in no way restrictive. It is furthermore understood that the indication of features using for example "first", "second", etc. also serves only for clarification and is in no way restrictive. It is likewise understood that the features of the various exemplary embodiments described herein may be combined with one another unless specifically stated otherwise. The following detailed description should therefore not be understood in a restrictive sense, and the scope of protection of the present invention is defined by the appended claims.

In the figures, identical or similar elements are provided with identical reference signs where this is expedient. Furthermore, thicknesses of lines may be indicated in exaggerated form in the figures for the sake of better presentability; for example, the thickness of a document of value or its security feature may be illustrated in exaggerated form in the figures, but may actually be small in comparison with other dimensions.

Figure 1:
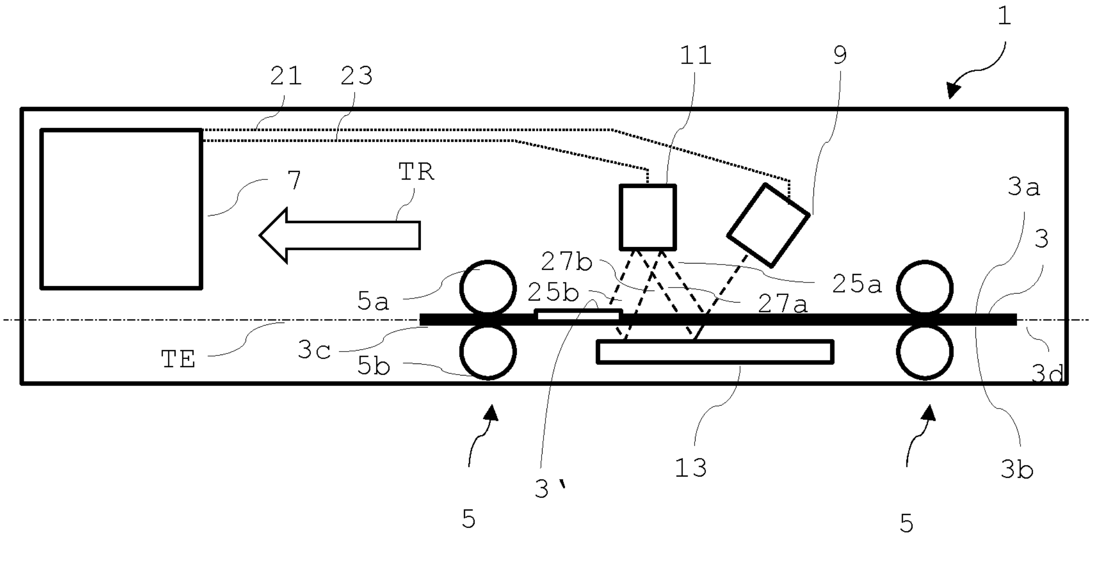
FIG. 1 shows a schematic arrangement (side view) of a transport device, an evaluation unit, a radiation emitter, a sensor, a reflector and a banknote in a device for verifying a security feature of a banknote.

FIG. 1 shows a schematic side view of a device 1 for checking a banknote 3 by verifying a security feature 3' of the banknote 3, wherein the device 1 has: a transport device 5, an evaluation unit 7, a radiation emitter 9, a sensor 11 and a reflector 13.

The banknote 3 is a rectangular, flat object made for example from paper having a first flat side 3*a* and a second flat side 3*b* situated opposite the first flat side 3*a*. The paper (or another fibrous material, for example also made from plastic) is partly transparent to radiation in the infrared spectrum (IR spectrum or IR for short), that is to say at least one part of emitted IR radiation is able to pass through the banknote 3, whereas another part thereof is reflected by the banknote 3. Preferably, the spectrum is a near-infrared spectrum in the region of approximately 850 nm to 1000 nm. Furthermore, the banknote 3 has two long edges 3*c*, 3*d* and two edges that are short in relation thereto. The security feature 3' is provided on at least one of the flat sides 3*a*, 3*b*, which security feature is defined as a region of the banknote 3 that is printed with phosphorescent ink. This may be for example the specification of the nominal value of the banknote. The phosphorescent ink is able to be excited by the radiation in the near-infrared spectrum, wherein phosphorescent radiation is then emitted that for example likewise has a near-infrared spectrum. The banknote 3 may have further (for example magnetic, reflective in the ultraviolet spectrum, etc.) security features that are able to be checked by other sensors of the device 1, this however not being explained in more detail here. In addition, the banknote 3 is not restricted to one kind of banknote, but is rather representative of a multiplicity of different banknotes, for example different denominations (physical size of the banknote) of one or various currencies. In the rest of the description, for the sake of ease of illustration, a case is described in which the first flat side 3*a* and the security feature 3' of the banknote 3 point upwards and the banknote is transported through the device 1 with one of its long edges at the front; however, it is likewise possible for the second flat side **3*b* to point upwards, the banknote 3 to be transported through the device 1 with one of its short edges at the front and/or the security feature 3' to be arranged in the material of the banknote 3** or point downwards.

The banknote 3 is able to be inserted into the device 1 from the right-hand side (in FIG. 1), for example through a banknote inlet (not shown), and is able to be transported through the device 1 to the left-hand side in a transport direction TR on a transport plane TE (dotted and dashed line) by way of the transport device 5. The first and the second flat side **3*a*, 3*b* are in this case arranged in the transport plane TE. The transport device 5 here has for example at least one pair of rollers 5*a*, 5*b* that are arranged axially parallel and transverse with respect to the conveying direction above and below the transport plane TE and form a gap in which the banknote 3 is able to be transported through the rollers 5*a*, 5*b* (FIG. 1 shows two pairs of rollers by way of example). It should be noted that any other transport mechanism is likewise able to be used in this context. To this end, the rollers 5*a*, 5*b* in each case contact one of the flat sides 3*a*, 3*b* of the banknote 3 and at least one of the rollers 5*a*, 5*b* is driven, for example by way of an electric motor (not shown). Furthermore, the transport device may have a banknote guide (not shown) that prevents the banknote from leaving the transport plane; this may be for example a guide plate on which the banknote bears during transport (for example glides along it). The transport speed is able to be controlled by the evaluation unit 7, which is connected to the transport device 5 for this purpose (not shown). For example, the transport speed is approximately 1.8 m/s-3.4 m/s, which ensures both swift transport of the banknote 3 and a sufficient period for recognizing a security feature 3'. After passing through the device 1, the banknote 3 is able to be dispensed at the left-hand side of the device 1**, for example into a storage area (not shown).

The radiation emitter 9 is embodied here as an LED that emits radiation in the near-infrared spectrum (for example in the case of an intensity maximum of approximately 950 nm). The LED 9 is electrically connected to the evaluation unit 7 for example by way of a cable 21 (dotted line) and is able to be switched on and switched off in a manner controlled thereby. As an alternative, the connection may also be a radio connection or an optical connection. Furthermore, the LED 9 is arranged above the transport plane TE and emits the radiation in the direction towards the first flat side **3*a* of the banknote 3. The IR radiation emitted by the LED 9 is selected or adjusted such that luminescence of the security feature 3' is excited. In this case, the LED 9 emits IR radiation that allows phosphorescence of the security feature 3'. The security feature 3'** then emits, in the excited state, phosphorescent radiation whose intensity decreases after the end of the IR irradiation at a predetermined rate per unit of time (dependent on the phosphorescent material).

On the same side of the transport plane TE and in the transport direction TR after the radiation emitter 9, a photodiode 11 is applied as sensor 11 (for example, a reverse arrangement is also possible, for example in the case of low transport speeds). The photodiode 11 is sensitive to the phosphorescent radiation arising as a result of the phosphorescence of the security feature 3'. The photodiode 11 has a sensitivity maximum of approximately 950 nm and is insensitive to radiation in the spectra below approximately 750 nm and above approximately 1100 nm. This means that the spectra of the photodiode 11 and of the LED 9 and of the corresponding phosphorescent radiation are tuned to one another. The photodiode 11 is electrically connected to the evaluation unit 7 by way of a cable 23 (dotted line) and outputs a signal to the evaluation unit 7, which signal corresponds to the radiation intensity sensed by the photodiode 11. The electrical connection of a photodiode to an evaluation unit and signal processing thereof are sufficiently known, and so no explanations are given with respect to this.

The photodiode 11 is oriented towards the transport plane TE and senses a region (field of vision) of the banknote 3, which region is able to be irradiated by the LED 9, for example the security feature 3' of the banknote 3 (for ease of illustration, the security feature 3' is shown in a position that is offset with respect to the photodiode 11 in the transport direction TR; however, the security feature 3' may be sensed at any position that lies in the field of vision of the photodiode 11). The following radiation paths are formed by the arrangement shown in FIG. 1:

- a first radiation path **25*a* (dashed line) of the IR radiation, going from the LED 9 to the banknote 3 (partial reflection) and to the photodiode 11**, and
- a second radiation path **25*b* (dashed line) of the phosphorescent radiation, going from the security feature 3' (first flat side 3*a*, that is to say facing the photodiode 11) and to the photodiode 11**.

The reflector 13 is attached on the other side of the transport plane TE (at the bottom in FIG. 1), the reflector being configured to reflect IR radiation in the spectrum of the LED 9 and of the phosphorescent radiation. Here, the reflector 13 is aligned parallel to the transport plane TE and positioned such that the following radiation paths are formed:

- a third radiation path **27*a* (dashed line) of the IR radiation, going from the LED 9, through the banknote 3, to the reflector 13 (reflection), through the banknote 3 and to the photodiode 11**, and
- a fourth radiation path **27*b* (dashed line) of the phosphorescent radiation, going from the security feature 3', through the banknote 3, to the reflector 13 (reflection), through the banknote 3 and to the photodiode 11**.

It is possible, by way of the four radiation paths **25*a*, 25*b*, 27*a*, 27*b*, to irradiate the security feature 3' on each of the flat sides 3*a*, 3*b* or to guide the phosphorescent radiation to the photodiode 11: part of the IR radiation emitted by the LED 9 impinges directly on the security feature 3' (flat side 3*a*) and the other part passes through the banknote 3, is reflected by the reflector 13 and likewise impinges on the security feature 3' (from the second flat side 3*b* after the reflected IR radiation has entered the banknote 3). The security feature 3' is thus also irradiated with IR radiation that would no longer be available without the reflector 13. In the same way, phosphorescent radiation of the security feature 3' is guided to the photodiode 11 directly (going from the flat side 3*a*) and indirectly (via the flat side 3*b*). Likewise, with this arrangement, it is possible to irradiate a security feature in the material of the banknote 3 (not shown) to an extent sufficient to ensure verification of the security feature embedded in the banknote 3**.

Figure 2:
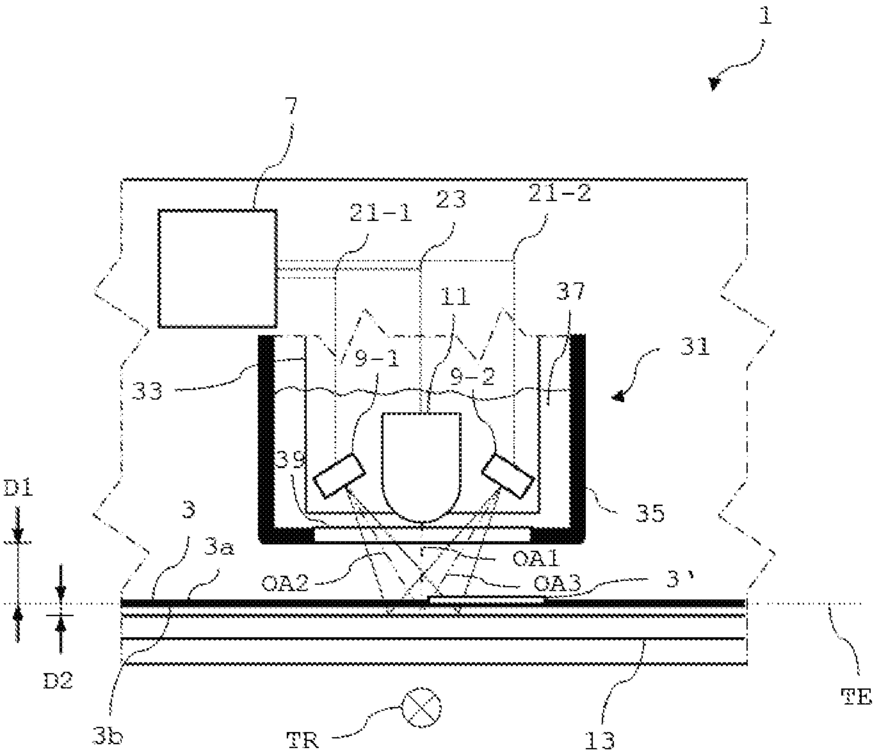
FIG. 2 shows a schematic illustration (front view) of a sensing channel with two LEDs and a photodiode in the device for verifying a security feature of a banknote.

With reference to FIG. 2, a sensing channel 31 having two LEDs 9-1, 9-2 and a photodiode 11 in the device 1 for verifying a security feature 3' of a banknote 3 is schematically illustrated. To this end, FIG. 2 shows a section of the device 1 in a front view (transport direction TR of the banknote 3 going into the plane of the drawing). The LEDs 9-1, 9-2 and the photodiode 11 are the same as described with reference to FIG. 1. The sensing channel 31 is arranged on the first flat side **3*a* of the banknote 3 and is formed by the LEDs 9-1, 9-2 and the photodiode 11 on a board 33 (circuit board, for example a printed circuit board (PCB)). The housing 35 serves to protect against soiling and to stabilize the LEDs 9-1, 9-2, the photodiode 11 and the circuit board 33 in the housing 35. Furthermore, the housing 35 is at least partly cast with a material 37 transparent to the emitted radiation and to the phosphorescent radiation (for example IR-transparent plastic). By way of the material 37, an optically uniform medium is created in the housing 35 and the components are durably protected. As an alternative, it is however possible to dispense with the material 37 and/or the housing 35 if the sensing channel 31 is directly fastened in the device 1. Furthermore, the housing 35 has a window 39 on its side facing the banknote 3, which window is transparent to the emitted radiation and the phosphorescent radiation. As already described for FIG. 1, the photodiode 11 is connected to the evaluation unit 7 by way of the cable 23 and the LEDs 9-1, 9-2 are connected to it by way of cables 21-1, 21-2. It is possible for example for the evaluation unit 7 to be embodied on the circuit board 33**.

The photodiode 11 of the sensing channel 31 has an optical axis OA1 (double dotted-dashed line) that is perpendicular to the transport plane TE. The optical axis OA1 of the photodiode 11 defines the centre of the region that is monitored by the photodiode 11 (field of vision). The sensitivity of the photodiode 11 is at a maximum along the optical axis OA1 of the photodiode 11. The window 39, that is to say with the negligible thickness thereof the photodiode 11 (its end facing the banknote 3), is arranged at a distance D1 (for example approximately 0.7 mm) from the transport plane TE. This means that the field of vision of the photodiode 11 is defined (substantially) by the alignment of the optical axis OA1 of the photodiode 11, the distance D1 and the radial sensitivity distribution of the photodiode 11 with respect to the optical axis OA1 of the photodiode 11. By way of example, the field of vision is symmetrical to the optical axis OA1 of the photodiode 11.

The LEDs 9-1, 9-2 are arranged transverse to the transport direction TR to the left and to the right of the photodiode 11 and each have an associated optical axis OA2, OA3 that intersects the optical axis OA1 of the photodiode. The LEDs 9-1, 9-2 are thus inclined with respect to the transport plane TE. The optical axes OA2, OA3 of the LEDs 9-1, 9-2 define the axes of the greatest radiation intensity of the emitted IR radiation. By way of example, the IR radiation is irradiated through the LEDs 9-1, 9-2 symmetrically to their optical axes OA2, OA3. The LEDs 9-1, 9-2 thus emit the IR radiation to a region of the banknote 3 that corresponds to the field of vision of the photodiode 11 (illustrated by the dashed lines).

The reflector 13 is arranged on the second flat side 3*b* of the banknote 3. The reflector 13 is aligned parallel to the transport plane TE, arranged at a distance D2 (for example approximately 0.7 mm) therefrom and is intersected by the optical axis OA1 of the photodiode 11. A small distance D2 increases the proportion of the radiation that is reflected to the photodiode 11. The distances D1 and D2 may add up to give a value of for example ≥1.4 mm, wherein D1 and D2 may have different values from one another. By way of example, it is possible for the reflector 13 to be embodied at least regionally as the banknote guide. As already described for FIG. 1, using the LEDs 9-1, 9-2 and the reflector 13, it is possible to generate the phosphorescent radiation of the security feature 3' and to reflect it to the photodiode 11.

FIG. 2 shows the security feature 3' by way of example, which security feature is offset transverse to the transport direction TR with respect to the optical axis OA1 of the photodiode 11, that is to say partly overlaps the field of vision of the photodiode 11. The security feature 3' thus receives the IR radiation emitted by the LEDs 9-1, 9-2 (LED 9-2: direct IR radiation; LED 9-1: direct and indirect IR radiation (reflected at the reflector 13)) and emits corresponding phosphorescent radiation that is sensed by the photodiode 11 (directly and indirectly (reflected at the reflector 13)).

The above-described arrangement of the LEDs 9-1, 9-2 and of the photodiode 11 is merely exemplary in nature; it is for example possible for the optical axes OA1, OA2 and OA3 to have different inclinations with respect to one another and/or not to intersect one another. By way of example, an arrangement is possible in which the LEDs 9-1, 9-2 irradiate a region of the banknote 3 that lies counter to the transport direction TR outside of the field of vision of the photodiode 11, and this region is transported by transporting the banknote 3 into the field of vision of the photodiode 11. This means that the security feature 3' may be excited outside of the field of vision of the photodiode 11 and then transported into the field of vision. The emitted radiation (which may also comprise for example spectra other than the IR spectrum, for example by way of additional LEDs) may thus be emitted in a field of vision of another sensor of the device 1 and used to sense other types of security feature, for example a security feature that is fluorescent in the ultraviolet spectrum.

By transporting the banknote 3 underneath the sensing channel 31, a strip (field of vision of the photodiode 11) of the banknote 3 is able to be sensed parallel to the short edges thereof, wherein the strip is checked for the presence of a security feature 3'. If a security feature 3' completely overlaps the strip, a maximum signal (100%) is output by the sensing channel. A partial overlap counts as able to be sensed securely if a signal is generated having a signal strength that corresponds to at least 50% of a maximum signal strength of the sensing channel. By way of example, a slight partial overlap of a security feature with a strip generates a signal with the strength of at least 50% of the maximum strength.

Figure 3:
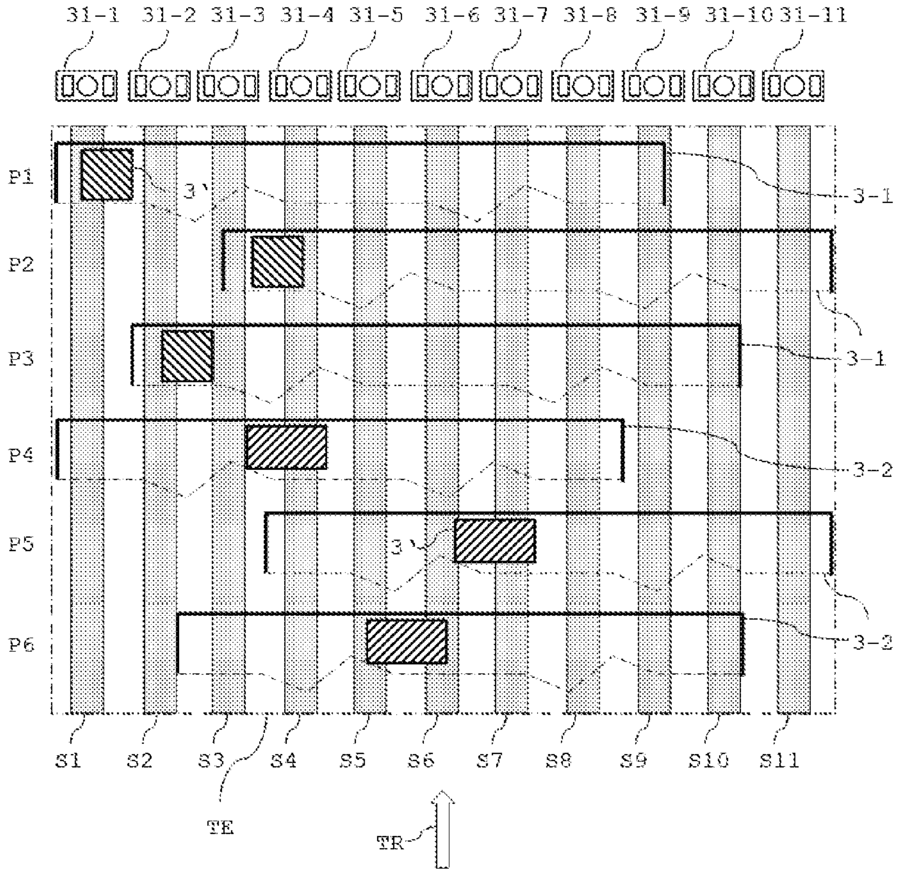
FIG. 3 shows a schematic arrangement (plan view) of eleven sensing channels in a device together with a plurality of possible positions of banknotes in the device for verifying a security feature of a banknote.

As different banknotes 3 are able to be accepted by the device 1 with different alignments, the position at which a security feature 3' occurs is unknown. To check the entire banknote 3, further sensing channels are required, wherein a multiplicity of strips to be checked are arranged transverse to the transport direction TR next to one another. This is shown in FIG. 3, which shows a schematic arrangement of sensing channels (first to eleventh sensing channel 31-1 to 31-11) in the device 1 together with a plurality of possible positions of a banknote 3 in a plan view (the transport direction of the banknote 3 is at the top in the plane of the drawing). The number of sensing channels depends on the largest banknote that is accepted by the device 1: as many sensing channels are provided as are necessary for being able to check the largest banknote along its long edge 3*c*, 3*d*.

In the embodiment of FIG. 3, a first and a second banknote 3-1, 3-2 having different sizes and differently positioned security features 3' are shown as banknote 3, by way of example. The banknotes 3-1, 3-2 are two different small banknotes having small security features 3' (for example approximately 13 mm×13 mm in the case of the first banknote 3-1), wherein, if the sensing of such a security feature is ensured, larger banknotes are also able to be checked securely. The sensing channels 31-1 to 31-11 correspond to the sensing channel 31 described in FIG. 2 in terms of function and construction. The sensing channels 31-1 to 31-11 monitor associated strips S1 to S11, within which it is possible to establish the presence of a security feature 3'. The banknotes 31-1, 31-2 are shown offset transverse to the transport direction TR in various positions P1 to P6: P1 to P3 for the first banknote 3-1 and P4 to P6 for the second banknote 3-2. In the positions shown, the banknotes 3-1, 3-2 are sensed by way of the sensing channels 31-1 to 31-11, wherein the associated security features 3' overlap the corresponding strips Si to S7. Examples of an overlap with strips S8 to S11 are not shown, but may however likewise be obtained by turning the banknotes 3-1, 3-2 onto their other flat side.

The first to eleventh sensing channels 31-1 to 31-11 are arranged from left to right at a distance from one another, which distance is configured to securely sense even the smallest security feature 3' (first banknote 3-1) in an unfavourable position of the first banknote 3-1 in the device 1 (for example first banknote 3-1 in position P3). In the example of FIG. 3, a maximum signal is generated for strips S4 and S7 when the second banknote 3-2 moves underneath the sensing channels 31-1 to 31-11 (through the security feature 3' of the second banknote 3-2 at position P4 and P5). Furthermore, by way of the at least partial overlap of the security feature 3' of the first banknote 3-1 with strips S1 (position P1), S4 (position P2) and S2 (position P3) and the at least partial overlap of the security feature 3' of the second banknote 3-2 with strips S5 and S6 (positions P5 and P6) when the banknotes 3-1, 3-2 pass underneath the sensing channels 31-1 to 31-11, a signal with at least 50% of the maximum signal strength is generated. Therefore, in the example of FIG. 3, all security features 3' are able to be sensed securely. By way of example, it is additionally possible to provide a further row of sensing channels in front of or behind the sensing channels 31-1 to 31-11 in the transport direction TR, which are offset with respect to the sensing channels 31-1 to 31-11 in the direction transverse to the transport direction TR by for example half a sensing channel, such that there is (for example substantially) full-surface sensing of the banknotes 3-1, 3-2. By way of example, in the arrangement shown in FIG. 3, ten further sensing channels that are offset with respect to the sensing channels 31-1 to 31-11 may be used.

Figure 4:
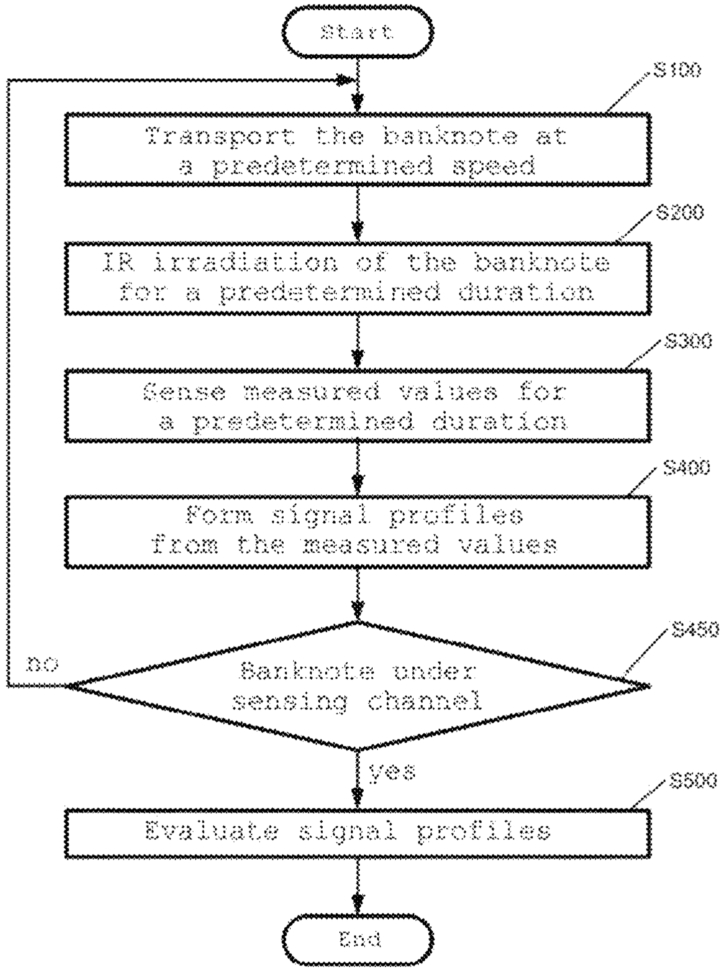
FIG. 4 shows a flow diagram of a method for verifying a security feature of a banknote.

FIG. 4 shows a flow diagram of a method for verifying a security feature of a banknote, which method is performed by the device 1 described in FIG. 2. The method is executed in a manner controlled by the evaluation unit 7.

As soon as the banknote 3 is inserted into the device 1, the banknote 3 is transported S100 through the device 1 at a predetermined transport speed (for example 1.8 m/s-3.4 m/s) by way of the transport device 5. The transport speed may be preset or be varied by the device 1, for example depending on the type of banknote (currency to be expected), for example by way of a characteristic diagram. By way of example, an item of information is transmitted to the device 1 by the automated teller machine as to which currency is intended to be processed, and the device 1 selects the corresponding parameters, for example the transport speed, from a characteristic diagram for the corresponding currency.

Subsequently, when the banknote 3 reaches the sensing channel 31, the banknote is irradiated S200 with IR radiation for a predetermined duration (for example approximately 75 μs). The irradiation excites the phosphorescence of the security feature 3' when it is situated in the irradiated region. The irradiation duration may be selected by the evaluation unit 7 depending on the type of banknote 3, for example on the basis of a characteristic diagram. Using the insertion time and the transport speed, it may be determined for example by the evaluation unit 7 whether the banknote 3 has reached the sensing channel 31.

After the irradiation (after the end of irradiation), measured values that are output by the photodiode 11 are sensed S300. This is performed by the evaluation unit 7 for a predetermined duration (for example approximately 400 μs). The sensing time may be selected by the evaluation unit 7 depending on the type of banknote 3, for example on the basis of a characteristic diagram. In the event that a security feature 3' is irradiated, the measured values constitute a typical profile of the decay of the phosphorescence (for example fall in radiation intensity per unit of time). In the event that a security feature 3' is not irradiated, the measured values constitute a typical system response of the measurement system (photodiode 11 and evaluation unit 7); this may be for example a constant signal (for example at least substantially unchanged signal) or a return of the measurement system from a saturation state.

Subsequently, a signal profile is formed S400 from the measured values by the evaluation unit 7. The signal profile is formed as long as the banknote 3 is transported underneath the sensing channel 31, as represented by query S450.

After this, the evaluation unit 7 determines whether a security feature 3' of the banknote 3 is present S500. This is performed by evaluating the signal profiles, that is to say comparing the signal profiles or sections of the signal profile that are present after the irradiation. By way of example, these are compared with a predetermined reference signal profile or with one another. The comparison of the signal profiles is performed for example using a specific radiation intensity drop per unit of time that is characteristic of the presence of a security feature 3' (or of a combination of a plurality of security features). The reference signal profiles may for example be stored in a database for a banknote or a multiplicity of banknotes, for example in the evaluation unit 7. The reference signal profiles may relate to an individual security feature or a combination (for example sequence) of a plurality of security features.

In the event that a signal profile is present within which the specific radiation intensity drop per unit of time is present, this signal profile corresponds to a reference signal profile of the sensing of a banknote with a security feature. Furthermore, this signal profile differs from a previous signal profile or section thereof in which no security feature is sensed by the specific radiation intensity drop per unit of time. If such a match with the reference signal profile or such a difference from the previous signal profile is determined by the evaluation unit 7, the security feature 3' is verified. By way of illustration, the evaluation unit 7 thus performs a pattern comparison (for example implemented by way of one or more processors) with a reference signal previously determined and stored for a respective security feature. If the evaluation unit 7 determines a match (represented by a match value or an error value) that is greater than a predefined threshold value that is able to be predefined or able to be set by the manufacturer or by a user for example, then the evaluation unit 7 outputs for example a signal that indicates that the respective security feature of the banknote has been positively determined. As an alternative, the banknote may also simply just be checked with regard to other security features or the banknote may also simply be accepted.

In the contrary event that such a signal profile is not present, the evaluation unit 7 determines that no security feature 3' of the banknote 3 was sensed. Thereupon, the evaluation unit 7 may for example perform one of the following actions: output a corresponding alarm signal, restart the system and check the banknote again, control the device so as to dispense the banknote into a storage area, tell the automated teller machine not to accept/dispense any more banknotes and/or adopt a security state, or the like.

What is claimed is:

1. A device for verifying a machine-readable security feature of a document of value, comprising:

a transport device configured to transport the document of value through the device on a transport plane in a transport direction, wherein a first flat side and a second flat side, opposite said first flat side, of the document of value extend parallel to the transport plane;

a radiation emitter having a first component radiation emitter and a second component radiation emitter, the radiation emitter fixedly arranged on the first flat side and emits radiation in the direction towards the first flat side, wherein the radiation is configured to excite luminescent radiation of the security feature of the document of value, and the radiation is further configured to pass at least partly through the document of value;

a sensor that is a photodiode tuned to the spectrum of the radiation emitter and is fixedly arranged between the first component radiation emitter and the second component radiation emitter along a direction transverse to the transport direction, the sensor arranged on the first flat side and is configured to receive at least part of the luminescent radiation and of the emitted radiation, the sensor and the radiation emitter at least partly encapsulated by a material transparent to the luminescent radiation and the emitted radiation;

a reflector that is arranged and configured on the second flat side so as to reflect the emitted radiation, passing through the document of value, of the radiation emitter and the luminescent radiation of the security feature of the document of value at least partly to the sensor, the reflector arranged at a distance of a maximum of 10 mm from the flat side of the document of value; and an evaluation unit configured to control the radiation emitter and to receive the signals output by the sensor; and wherein, when an optical axis of the sensor is perpendicular to the transport plane, a distance of the sensor from the flat side of the document of value is 1 mm-3 mm; and wherein a field of vision of the sensor is configured such that a minimum dimension, able to be sensed by the sensor, of the security feature of the document of value, transverse to the transport direction, which is able to be sensed with respect to a maximum signal strength of the sensor when sensing the security feature with a signal strength of at least 50%, is 5 mm-10 mm.

2. The device according to Claim 1, wherein the radiation emitter is an LED.

3. The device according to Claim 1, wherein the sensor is a photodiode that is tuned to the spectrum of the radiation emitter.

4. The device according to Claim 1, wherein an optical axis of the radiation emitter is inclined with respect to the transport plane such that its point of intersection with the transport plane and the reflector lies in the field of vision of the sensor.

5. The device according to Claim 1, wherein the sensor interacts with the radiation emitter as a sensing channel that senses a strip of the document of value in the transport direction when the document of value is transported, and a plurality of sensing channels are arranged next to one another transverse to the transport direction of the document of value.

6. The device according to claim 1, wherein the document of value is one of:

a banknote;

a cheque;

proof of identity;

a passport;

a travel ticket;

a share document.

7. The device according to claim 6, wherein the transport device is configured such that the document of value is able to be transported through the device with one of its long edges at the front.

8. A method for verifying a machine-readable security feature of a document of value during transport thereof between a sensor and a radiation emitter on one side and a reflector on the other side, wherein the method involves:

determining a transport speed and an irradiation duration for the document of value;

transporting the document of value at the transport speed determined during said determining;

irradiating the document of value, by way of the radiation emitter, for the irradiation duration determined during said determining;

sensing, using the sensor, a plurality of measured values over the irradiation duration determined during said determining that corresponds to luminescent radiation of the security feature that is excited by the irradiation of the document of value, and to radiation reflected by the reflector;

forming a signal profile from the measured values using an evaluation unit; and evaluating, using the evaluation unit, whether a security feature is present by comparing the sensed signal profiles;

wherein the radiation emitter has a first component radiation emitter and a second component radiation emitter and the sensor is a photodiode tuned to the spectrum of the radiation emitter and is arranged between the first component radiation emitter and the second component radiation emitter along a direction transverse to the transport direction, and wherein the sensor and the radiation emitter are at least partly encapsulated by a material transparent to the luminescent radiation and the emitted radiation, and wherein the reflector is arranged at a distance of a maximum of 10 mm from the flat side of the document of value, and wherein, when an optical axis of the sensor is perpendicular to the transport plane, a distance of the sensor from the flat side of the document of value is 1 mm-3 mm, wherein a field of vision of the sensor is configured such that a minimum dimension, able to be sensed by the sensor, of the security feature of the document of value, transverse to the transport direction, which is able to be sensed with respect to a maximum signal strength of the sensor when sensing the security feature with a signal strength of at least 50%, is 5 mm-10 mm, and wherein the sensor and the radiation emitter are fixedly arranged relative to the transport plane and transport direction.

9. The method according to claim 8, wherein the evaluation of the signal profiles reveals that a security feature is present if a value formed in a subtraction of the signal profiles is greater than a reference value.

10. The method according to claim 8 where the signals output by the sensor is based at least in part on the luminescent radiation sensed and the reflected radiation sensed.

* * * * *